J. SHEW.
Hand Corn-Planter.
No. 202,593. Patented April 16, 1878.
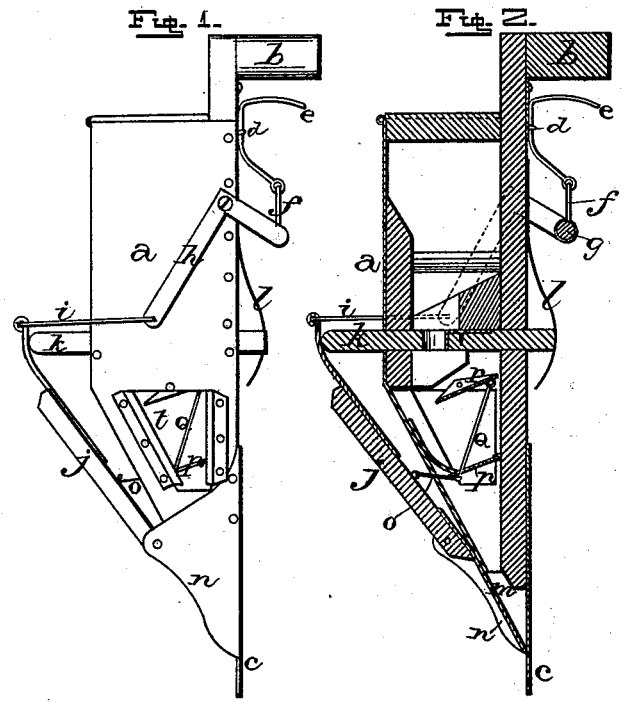
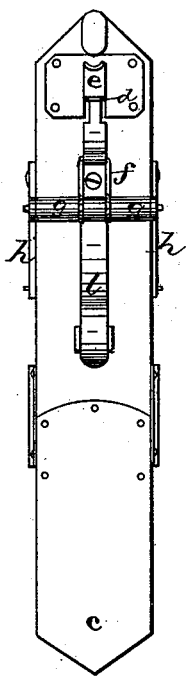
Witnesses:
J. W. Garner
W. S. D. Hames
Inventor:
Jas. Shew,
per
F. A. Lehmann,
Atty.

UNITED STATES PATENT OFFICE.

JACOB SHEW, OF BALTIMORE COUNTY, MARYLAND.

IMPROVEMENT IN HAND CORN-PLANTERS.

Specification forming part of Letters Patent No. 202,593, dated April 16, 1878; application filed March 14, 1878.

*To all whom it may concern:*

Be it known that I, JACOB SHEW, of Baltimore county, in the State of Maryland, have invented certain new and useful Improvements in Hand Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in hand corn-planters; and it consists in the arrangement and combination of devices, that will be more fully described hereinafter, whereby a cheap, simple, and effective planter is produced.

Figure 1 is a side elevation of my invention. Fig. 2 is a vertical section of the same. Fig. 3 is a rear edge elevation.

$a$ represents the body of my planter, which is provided with the rigid handle $b$ and the sharp-pointed flanged metal shovel $c$ on its lower end, for making a hole in the ground for the seed to drop in. Secured in position by means of a staple, $d$, on the rear edge of the frame, is the vertically-moving handle $e$, which is to be operated by the fingers, and to the lower end of this handle is connected, by means of the rod $f$, the cross-rod $g$, which unites the shorter ends of the two cranked levers $h$ together. The longer ends of these two levers $h$ have the bail $i$ fastened to them, which bail projects some distance beyond the front edge of the frame, and is fastened to the upper end of the lever $j$, as shown. The projecting end of the seed-slide $k$ bears against the inner side of the lever $j$, while the opposite end bears against the inside of the flat spring $l$.

When the handle $e$ is drawn upward by the fingers, the long ends of cranked levers $h$ are forced backward, drawing the lever $j$ and seed-slide $k$ back with them. As soon as the handle is released the flat spring $l$ forces the slide instantly back into position again.

To the lower end of the lever $j$ is secured the usual gate $m$, which serves to open the hole for the grains to fall into, and which gate is protected from dirt upon its edges by the flanges $n$ on the shovel $c$. To the inside of the lever $j$ is fastened a connecting-rod, $o$, which rod has its inner end fastened to the valve $p$. To the front edge of this valve is connected a rod, $q$, which has its upper end fastened to the under side of the rocking valve $r$ just under the seed-slide. These two valves $p$ $r$ and gate $m$ form three chambers in the bottom of the frame, as shown.

When the seed-slide is moved backward, as above described, the valve $r$ is caused to close, so that the grains will fall upon it, and at the same time the valve $p$ and gate are both caused to open. As the slide springs back into position, after dropping the grains, the valve $r$ opens, and the valve $p$ and gate $m$ close. This valve and gate remain closed until the slide is again operated, when they allow the first grains to drop into the earth, and then close in time to catch the next grains from above.

In order that the operator may see exactly how the machine is working, and how many grains are being dropped each time, the windows $t$ are provided, through which the number of grains can be readily seen.

I am aware that a rigid handle, and a movable handle having a mechanism attached thereto, so as to operate both the slide and jaws of the machine, are old, and this I disclaim. I limit my invention of this part of the machine to the devices shown.

Having thus described my invention, I claim—

1. The combination of the frame $a$, rigid handle $b$, movable handle $e$, rods $f$ $g$, levers $h$, bail $i$, lever $j$, slide $k$, and flat spring $l$, substantially as shown.

2. The combination of the lever $j$, connecting-rod $o$, valve $p$, rod $q$, and valve $r$, with an operating mechanism, substantially as described.

In testimony that I claim the foregoing I have hereunto set my hand this 6th day of March, 1878.

JACOB SHEW.

Witnesses:
F. A. LEHMANN,
WILL. H. KERN.